US008752175B2

(12) United States Patent
Porter (10) Patent No.: US 8,752,175 B2
(45) Date of Patent: Jun. 10, 2014

(54) METHOD AND APPARATUS FOR NETWORK INTRUSION DETECTION (75) Inventor: Richard H. Porter, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 123 days.

(21) Appl. No.: 13/126,335

(22) PCT Filed: Oct. 31, 2008

(86) PCT No.: PCT/US2008/082150
§ 371 (c)(1),
(2), (4) Date: Apr. 27, 2011

(87) PCT Pub. No.: WO2010/050983
PCT Pub. Date: May 6, 2010

(65) Prior Publication Data
US 2011/0219452 A1    Sep. 8, 2011

(51) Int. Cl.
*H04L 29/06* (2006.01)
(52) U.S. Cl.
USPC ............................................ 726/23; 713/153
(58) Field of Classification Search
None
See application file for complete search history.

(56) References Cited

U.S. PATENT DOCUMENTS

| | | | |
|---|---|---|---|
| 7,159,237 B2 | 1/2007 | Schneier et al. | |
| 7,216,365 B2 | 5/2007 | Bhagwat et al. | |
| 7,228,564 B2 | 6/2007 | Raikar et al. | |
| 7,339,914 B2 | 3/2008 | Bhagwat et al. | |
| 7,370,362 B2 | 5/2008 | Olson et al. | |
| 7,970,894 B1* | 6/2011 | Patwardhan | 709/224 |
| 2002/0083175 A1* | 6/2002 | Afek et al. | 709/225 |
| 2006/0074666 A1* | 4/2006 | Chung | 704/257 |
| 2006/0161984 A1* | 7/2006 | Phillips et al. | 726/24 |
| 2007/0291945 A1 | 12/2007 | Chuang et al. | |

FOREIGN PATENT DOCUMENTS

WO    WO-2007061167 A1    5/2007

OTHER PUBLICATIONS

Eeyah, R.; Kangude, S. Yu, G.; Strickland, B.; Copeland, J., Rogue access point detection using temporal traffic characteristics, Global Telecommunications Conference, 2004. GLOBECOM '04, IEEE, vol. 4, Dec. 3, 2004, pp. 2271-2275.
Srilasak, S.; Wongthavarawat, K., Phonphoem, A., "Integrated Wireless Rogue Access Point Detection and Counterattack System," Information Security and Assurance, 2008. ISA 2008. International Conference on Apr. 26, 2008.

* cited by examiner

*Primary Examiner* — Gilberto Barron
*Assistant Examiner* — Izunna Okeke (57) ABSTRACT

The current invention discloses a method and apparatus to detect and mitigate network intrusion by collecting a first log of wireless network traffic in the vicinity of an area and a second log of network traffic from a switch port connected to the area; pre-processing the logs; and then detecting the presence of unauthorized access points (APs) by attempting to identify matching patterns in the pre-processed first and second logs.

16 Claims, 6 Drawing Sheets

| TCP Length | Seq # | | Adjusted Length | Seq # |
|---:|---:|---|---:|---:|
| 439 | 7 | | 439 | 19 |
| 1460 | 8 | | 1460 | 21 |
| 1460 | 9 | | 1460 | 22 |
| 1460 | 10 | | 1460 | 23 |
| 1460 | 11 | | 1460 | 24 |
| 1460 | 12 | | 1460 | 26 |
| 1460 | 14 | | 1460 | 28 |
| 174 | 16 | | 174 | 29 |
| 351 | 22 | | 351 | 37 |
| 160 | 23 | | 160 | 38 |
| 411 | 27 | | 411 | 42 |
| 769 | 42 | | 769 | 63 |
| 354 | 48 | | 354 | 70 |
| 852 | 56 | | 852 | 81 |
| 378 | 65 | | 378 | 94 |
| 165 | 70 | | 165 | 103 |
| 243 | 72 | | 243 | 107 |
| 1460 | 73 | | 1460 | 109 |
| 580 | 74 | | 580 | 110 |
| 205 | 82 | | 205 | 121 |
| 239 | 86 | | 239 | 127 |
| 369 | 96 | | 369 | 135 |
| 269 | 97 | | 269 | 136 |
| 1460 | 100 | | 1460 | 141 |
| 44 | 101 | | 44 | 142 |
| 1448 | 102 | | 1448 | 144 |
| 1460 | 103 | | 1460 | 149 |
| 1460 | 104 | | 1460 | 150 |
| 913 | 105 | | 913 | 151 |
| 1234 | 109 | | 1234 | 155 |
| 1460 | 120 | | 1460 | 167 |
| 1460 | 121 | | 1460 | 168 |
| 1460 | 122 | | 1460 | 169 |
| 1460 | 123 | | 1460 | 170 |
| 759 | 124 | | 759 | 171 |
| 539 | 126 | | 539 | 173 |
| 236 | 132 | | 236 | 180 |
| 440 | 137 | | 440 | 185 |
| 1339 | 141 | | 1339 | 191 |
| 530 | 142 | | 530 | 192 |

METHOD AND APPARATUS FOR NETWORK INTRUSION DETECTION

BACKGROUND

The current invention is related to computer networks, and in particular to network security of an infrastructure computer network, for example, an enterprise network.

Use of wireless networks such as wireless local area networks (WLANs) is becoming widespread and so are the accompanying network security issues. Wireless networks present concerns in network security. One such concern is detecting rogue access points (APs) in a wireless network as part of an infrastructure computer network, for example, an enterprise network.

A WLAN may be ad hoc, in that any station may communicate directly with any other station, or have an infrastructure in which a station can only communicate with another station via an access point (AP). The AP may be coupled to other networks that may be wired or wireless. That network, e.g., the Internet or an intranet, being coupled to by the AP is called the "wired" network herein, and it is to be understood that this wired network may be an internetwork that include other wireless networks.

Network security concerns may arise, for example, when an unauthorized wireless access point gets connected to an otherwise secure local area network (LAN). The unauthorized wireless access point is usually referred to as a rogue access point (AP).

A rogue AP connected to an otherwise secure LAN may present a security hole as it may enable illegitimate access to the secure LAN. A rogue AP in the radio environment of a WLAN may interfere with the normal operations of the WLAN as it may hamper potential client from accessing their WLAN from legitimate APs.

A rogue AP may be a non-malicious or malicious rogue AP. A non-malicious rogue AP, for example, may be the AP of a user who sets up such an AP for personal use without intentionally thwarting detection. Such a user is likely to use out-of-the-box default configurations. Therefore, when used in the radio environment of a WLAN of interest, the service set identifier (SSID) of such anon-malicious AP typically will not match the SSID of the WLAN of interest.

A malicious rogue AP is one set up by a user in order to gain access to a wired network of interest, e.g., a secure LAN. Such a malicious AP may spoof the MAC address of a legitimate AP. Such a malicious AP may further set parameters such as the power, channel, and SSID again to spoof those of a legitimate AP in order to minimize the likelihood of being detected.

WLANs may have several potential problems because of rogue access points. A rogue access point, when connected to a secure network, may cause the network to become insecure by enabling, for example, illegitimate access to an otherwise secure intranet. In a well-designed WLAN, the access points typically have been configured to provide a certain level of coverage and capacity. Rogue access points may cause degradation to such planned coverage and capacity by causing contention with a legitimate AP, by causing collisions with a legitimate AP, and even by possibly causing denial of service for a legitimate client.

As wireless router/access point devices designed for home or small business use) are getting cheaper and thus more affordable, it may be more common that a rogue AP may exist, for example, in an enterprise network environment because a user may reconfigure a personal wireless access point to substitute for a designated personal computer. Thus, the security issues that arise as a result may warrant further consideration for network engineers and administrators.

As today's low cost router devices may include a built-in firewall that may utilize network address translation (NAT) to hide the addresses of wireless-side client devices behind a single address visible to a LAN, the task of detecting the existence of rogue access point may not be straight-forward.

Existing methods for detecting rogue access points may rely on users to report rogue AP or may take a sniffer approach. Even with full cooperation from owners of non-malicious rogue APs, this may not detect malicious APs that were set up with the intent to deceive and hide.

For example, an operator may periodically walk the area with a sniffer device that can be carried to the area, making measurements to search for rogue APs. But this may be hard to implement, for example, with unknown yet legitimate APs from a neighboring building or adjacent office space.

Also known is a sniffer technique that uses known legitimate APs as sniffers. Such APs may be managed from a central location by a management entity. Most of the time, such a managed AP may act as regular access point. When a rogue scan is being conducted, a management entity issues a command, e.g., a simple network management protocol (SNMP) command to the managed AP, convening it into a wireless sniffer. The managed AP may scan the airwaves within its coverage radius, looking for traffic on all channels. The AP then reports all data back to the management entity as a trace, and then returns to normal operation mode. The management entity analyzes the traces from managed APs and sentry devices, comparing the detected APs to its database of authentic, managed APs. Such a method, however requires the AP to cease normal operation and may not work when faced with unknown yet legitimate APs from neighboring buildings.

Furthermore, the sniffer may be configured to broadcast marker or discovery packets in a neighborhood being scanned. These marker or discovery packets may be routed by a rogue AP into the secure LAN. Thus, the existence of a marker or discovery packet, broadcast by a sniffer, inside the secure LAN may confirm the existence of a rogue AP. A similar approach may broadcast marker or discovery packets from the secure LAN and look for the existence of a marker or discovery packet in an area with suspected rogue APs. However, these approaches may be hard to implement because, for example, the marker or discovery packets such as internet control and management protocol (ICMP) packets may not penetrate a firewall in the rogue AP. The marker and discovery packets may not cross over sub-domains or virtual local area networks (VLANs). Furthermore, the active injection of marker or discovery packet may disrupt or degrade normal network operations for legitimate users.

Additionally, by assuming that the rogue AP is not performing a network address translation (NAT), other techniques for locating the switch ports to which a rogue AP is connected may include correlation-based solutions which may attempt to correlate an IEEE 802.11 radio media access (MAC) address to the wire-side MAC address of the rogue AP. Once the MAC addresses are correlated, the edge switches may then be searched to locate the MAC address. MAC addresses may also be captured from client devices that are associated with the rogue AP, and these captured addresses may also be used to search edge devices to locate the rogue AP.

However, these correlation-based solutions may work only if a correlation does indeed exist. This assumption may be problematic as many access points exist in which there is no relation between the radio MAC address and the Ethernet MAC addresses because of the NAT process mentioned above.

BRIEF DESCRIPTION OF THE DRAWINGS

Embodiments will now be described in connection with the associated drawings, in which.

DETAILED DESCRIPTION OF THE EMBODIMENTS

Exemplary embodiments are discussed in detail below.

Figure 1:
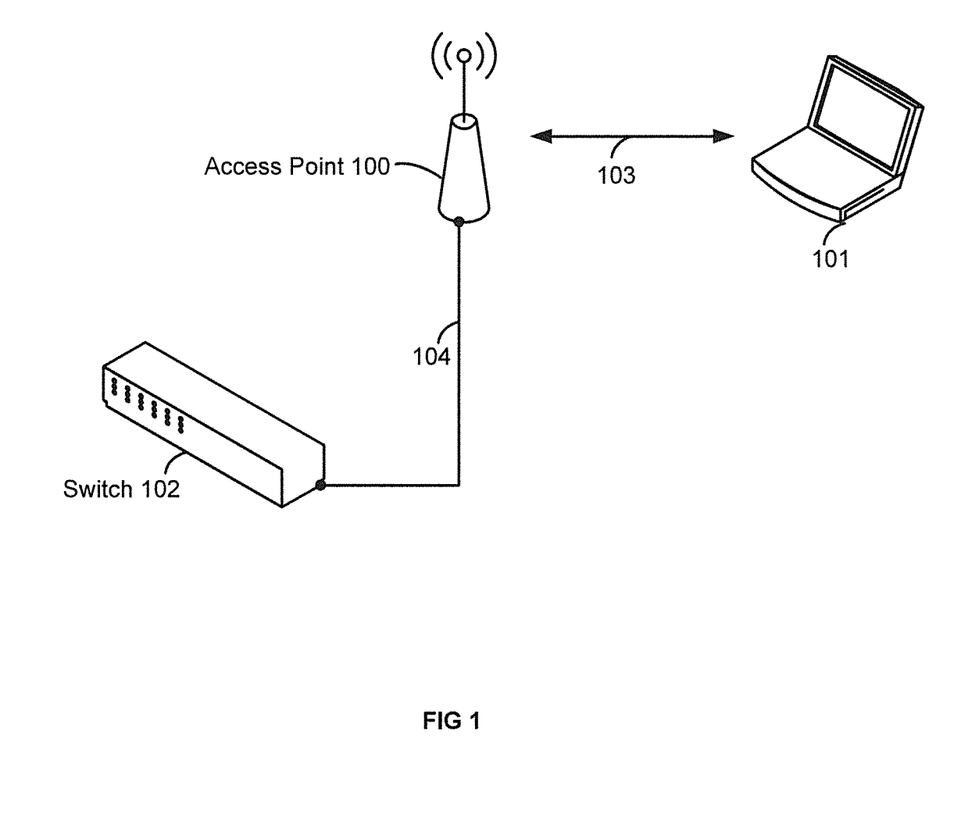
FIG. 1 depicts an exemplary local area network with a wireless access point (AP).

FIG. 1 depicts an exemplary local area network (LAN) with a wireless access point (AP). Wireless AP 100 communicates with client 101 through air link 103 and with switch 102 through link 104. Link 103 may be encrypted and link 104 may be wired. Switch 102 may be configured to run a secure LAN.

Wireless AP 100 may be, for example, a wireless router. FIG. 1 may be representative of a computer network, for example, an enterprise network, with at least one wireless part comprising at least one wireless AP.

The availability of low-cost wireless devices makes it more likely that wireless AP 100 may be unauthorized. This may happen, for example, if a legitimate user simply plugs in a personal wireless router at a designated LAN port and applies a designated media access (MAC) address to his/her personal wireless router. Because an unauthorized wireless AP may not be as diligently maintained as otherwise, security concerns may arise as an outside user, from a neighboring building or in the garage, may be able to access the secure LAN. More alarmingly, because the network administrator may not even notice the existence of the unauthorized wireless AP because, for example, the unauthorized wireless AP may have NAT capability as mentioned above, this security hole may persist without being detected.

Figure 2:
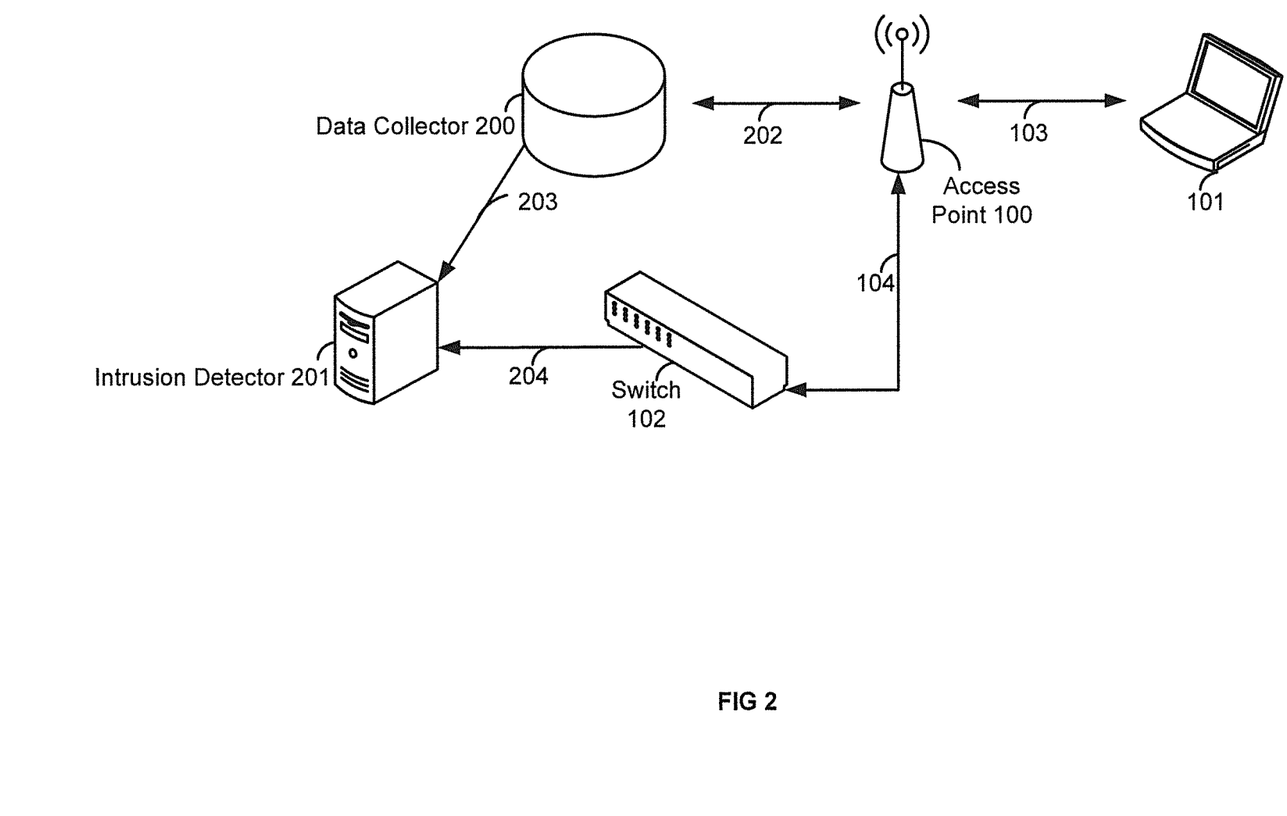
FIG. 2 depicts an exemplary embodiment of the current invention.

FIG. 2 depicts an exemplary embodiment of the current invention. A data collector 200 may listen and capture wireless data in the neighborhood of wireless AP 100, via link 202. Link 202 may overlap with air link 103. Data collector 200 may be a wireless AP device with the capability to log or analyze wireless traffic. Data collector 200 may send a log of analysis of wireless traffic to wireless intrusion detector (WID) 201 via link 203. Data collector 200 may be managed by a network management interface, for example, a simple network management protocol (SNMP) interface, installed, for example, on WID 201. WID 201 may also monitor network traffic of a port on switch 102 via link 204.

WID 201 may be a dedicated computer for the purpose of intrusion detection and mitigation. WID 201 may also be a computer application program running on a general-purpose computer. WID 201 may have access to the configuration and management interfaces of switches in the network that might have an unauthorized wireless AP attached to one port on the switches. WID 201 may continuously monitor network traffic on various switch ports to detect the presence of an unauthorized wireless AP.

Figure 3:
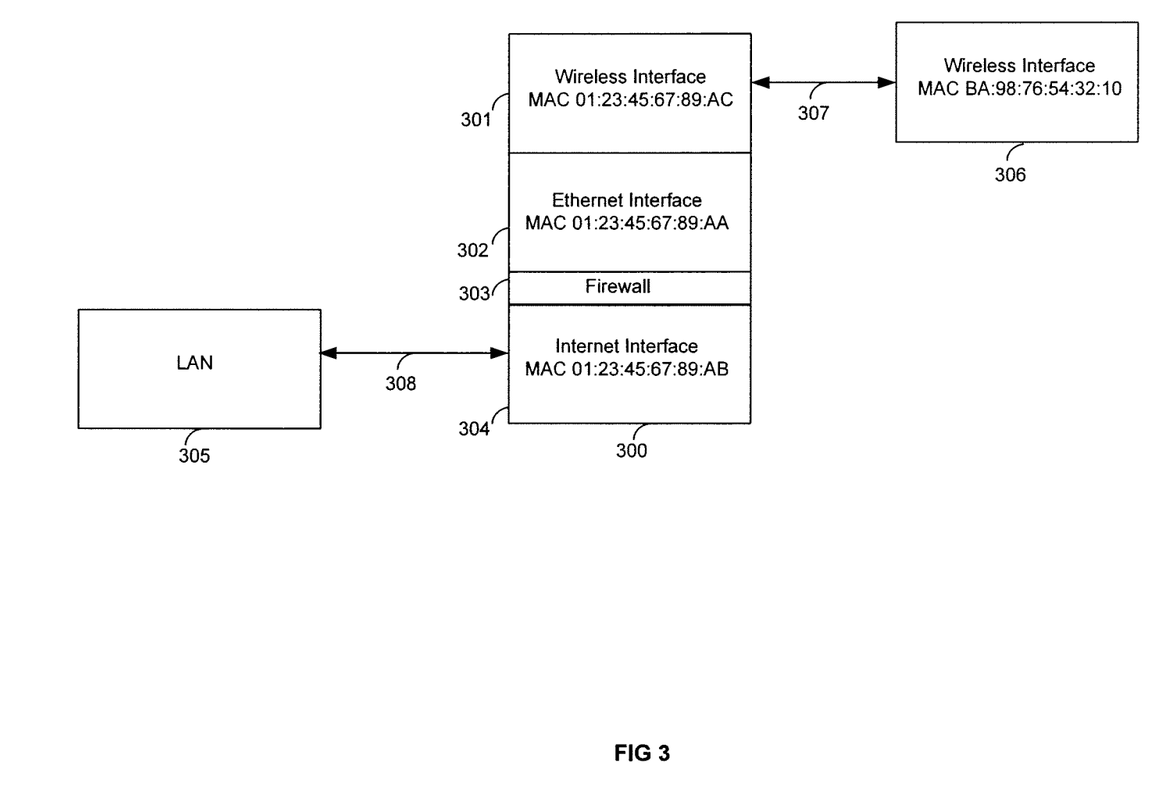
FIG. 3 illustrates an exemplary network address translation (NAT) at a wireless AP.

FIG. 3 illustrates exemplary network address translation (NAT) at a wireless AP 100. Block 300 shows the logic composition of a wireless AP 100 for the purpose of NAT. Block 300 may comprise blocks 301, 303, and 304. Block 301 is a wireless interface to connect with block 306, representing a wireless interface of a wireless client 101. The connection may be via link 307 which may carry encrypted data. Block 303 is a NAT firewall that may separate, for example, the wireless side from the wired side. Block 304 is an internet interface to be connected with LAN 305 via link 308. Block 300 may further comprise a local Ethernet interface as block 302.

The function of firewall 303 is such that all packets received from wireless client 101 by block 301, above firewall 303, may have their source MAC and IP address changed to match that of, for example, block 304, an internet interface, in order to be forwarded to LAN 305. Conversely, packets received from LAN 305 by block 304, an internet interface, may have their source MAC addresses changed to match that of, for example, a local Ethernet interface 302. In order to be forwarded to wireless client 101, block 303 may replace the destination MAC and IP addresses of the packets received from LAN 305 with those of the wireless interface 306. This NAT process may render it difficult to notice the presence of an unauthorized wireless AP by simply looking for packets with unknown MAC or IP addresses as either source address or destination address. Please note the MAC addresses shown are for illustration purposes.

Figure 4:
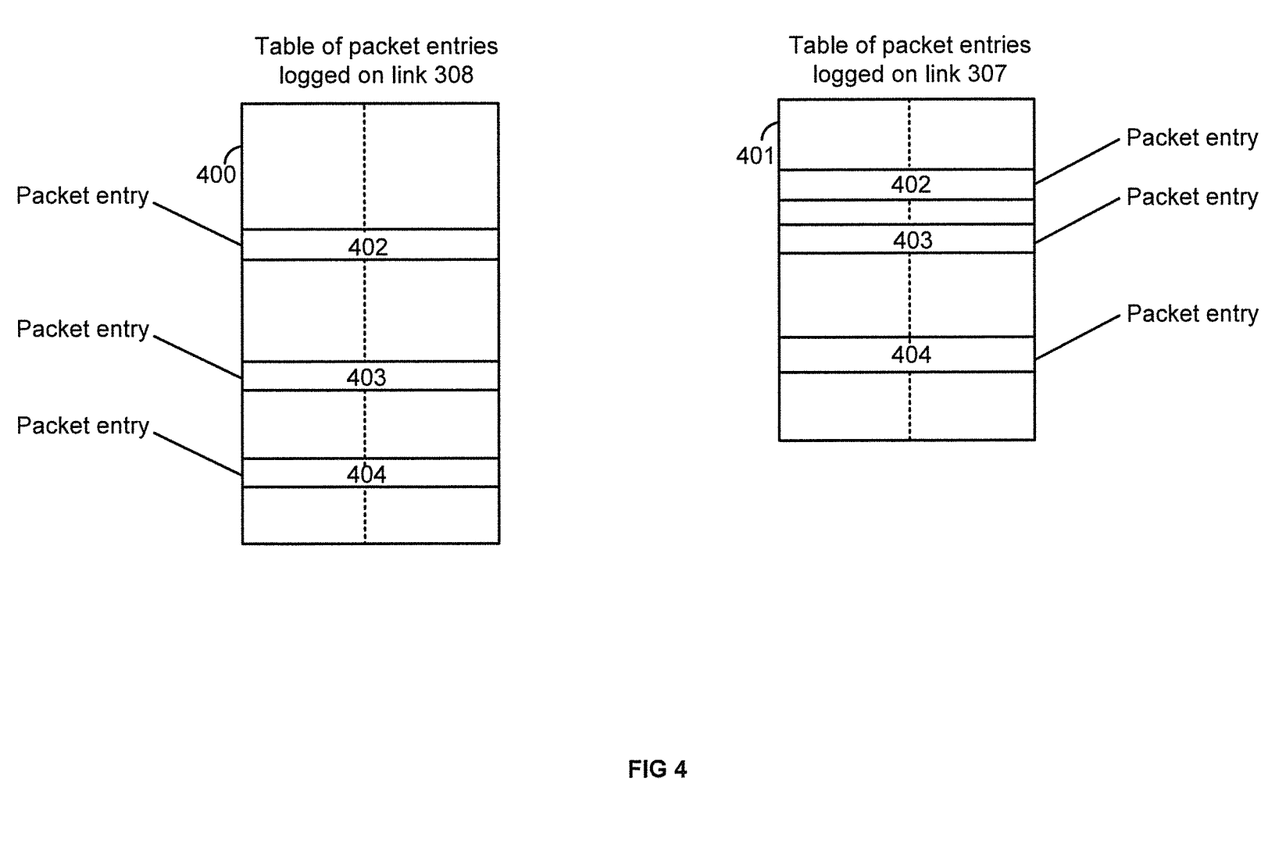
FIG. 4 illustrates exemplary packet pattern matching associated with the current invention.

FIG. 4 illustrates exemplary packet pattern matching associated with the current invention. Block 400 is a table with each entry representing a packet logged on link 308. Block 401 is a table with each entry representing a packet logged on link 307. Blocks 402-404 represent packets that travel across and are logged on both links 307 and 308.

Because packets that travel across both links 307 and 308 may be present on both blocks 400 and 401, matching identifying characteristics of packets within blocks 400 and 401 may lead to detection of the presence of an unauthorized wireless AP.

Block 401 may contain entries representing packets from, for example, multiple wireless clients 101 and may contain entries representing packets from wireless devices, for example, computers with wireless cards in the next building or in the neighborhood of wireless AP 100. Block 400 may contain entries representing packets from, for example, multiple wireless APs. Thus, the relative locations of blocks 402-404 in blocks 400 and 401 may be quite different. For example, blocks 402-404 may be separated by different numbers of entries within blocks 400 and 401.

Furthermore, the blocks 402-404 may contain payloads of encrypted contents, for example, corresponding to IEEE 802.11 wireless encryption over link 307. In addition, blocks 402-404 may represent packets with different headers corresponding to, for example, different media access (MAC) and physical (PHY) layers, such as, Ethernet (e.g., IEEE 802.3) for block 400 and IEEE 801.11 for block 401.

Blocks 402-404 may constitute data frames and the existence of data frames may further necessitate transmitting frames of different types such as management frames, control frames, etc. Data-carrying packets correspond to data frames and non-data-carrying packets correspond to frames of different types.

For example, block 400 may contain Pause frames, which may halt the . transmission of a sender for a specified period of time. For example, block 400 may contain frames used for the carrier sense multiple access/collision detect (CSMA/CD) protocol, which may allow multiple devices to share a common transmission medium such as, for example, an Ethernet cable, with collision and congestion avoidance.

Protocols such as Ethernet II, IEEE 802.2, IEEE 802.3, and IEEE 802.11, etc., define various formats for a supported frame being transported over physical media that may be wired or wireless. A frame may have control fields that show, inter alia, frame type, length, and various indicators, such as logical link control (LLC) parameters, slot time, back-off time, retransmit time, rate control parameters, etc. In addition, all frames may contain addresses (e.g. MAC and IP) of the source and destination devices, a frame sequence number, frame body, and frame checksum which may be used for error detection. A frame plus its preamble and a frame start delimiter may usually be referred to as a packet, thus the terms frame and packet may be used interchangeably by a person of ordinary skill in the art.

Management frames within block 401 may include, for example, an authentication frame, a deauthentication frame, an association request frame, an association response frame, a reassociation request frame, a reassociation response frame, a disassociation frame, a beacon frame, a probe request frame, a probe response frame, etc., which may be used to enable wireless devices to establish and maintain communications.

Control frames within block 401 may include, for example, an acknowledgement frame (ACK), a negative acknowledgement frame (NACK), a request to send (RTS) frame, a clear to send (CTS) frame, etc., which may be used for collision avoidance of data frames between devices in the network and for retransmission of frames not received or received with errors.

Specifically, the IEEE 802.11 standard defines various frame types that devices (e.g. network interface cards and wireless APs) may use for communications. A frame may have a control field that depicts the 802.11 protocol version, frame type, and various indicators, such as whether wired equivalent privacy (WEP) is utilized, power management is active, and so on. In addition, all frames may contain MAC addresses of the source and destination devices, a basic service set identifier (BSSID), a frame sequence number, frame body, and frame check sequence which may be used for error detection.

Similar, but protocol-specific, frame arrangement may be found for other protocols such as, for example, the IEEE 802.16 (also known in the art as the WiMAX) protocol.

The details of these management and control frames may also depend on network vendor. For example, Novell and Cisco may have different implementations.

For pattern matching purposes, packets used as management and control frames may be removed. This may be achieved, for example, by inspecting the frame type field of a packet. These packets may be retransmitted, for example, if receipt is not acknowledged within a period of time when packets are transmitted across a wireless link. Retransmitted packets may be removed as well. Retransmitted packets may be identified by inspecting an appropriate field of a packet.

It should be noted that payloads of data-carrying packets may be extracted from packets after removing protocol overheads based on specifications for the underlying protocols.

For example, for data-carrying packets within block 400, transmission control protocol (TCP) payload may be extracted by removing protocol overheads. For example, for data-carrying packets within block 401, adjusted payload may be extracted by removing IEEE 802.11 protocol overhead.

There are various approaches of matching the payload of packets within block 400 with those within block 401.

For example, payloads may be compared directly, byte by byte, for each packet. The comparison may be embodied as a subtraction operation between two payloads being compared. This approach may entail a large number of comparisons to search for a matching packet with the corresponding payload, and may fail to identify matching payloads if encryptions for packets within block 400 and 401 are not identical.

Payload comparison may be performed by indirect comparison of each constituent byte of two payloads being compared. For example, properties that characterize the payload content may be compared. The characteristic properties may include, for example, payload length, checksum, or hash function values. These values may not be unique but may be sufficient for matching purposes.

Specifically, payloads of data-carrying packets within blocks 400 and 401 may be represented by their length, for example, by the number of bytes of data contained in the payload, or represented in a compressed form, for example. as a numeric value resulting from a checksum or hash-function calculation performed on the payload. As commonly known in the art, checksum and hash functions may lead to low-collision mappings. Exemplary checksum may be embodied as: cyclic redundancy code (CRC) checksum, Fletcher's checksum, Adler-32's checksum, etc. Exemplary hash functions may include: Message-Digest algorithm 5 (MD-5), Message-Digest algorithm 4 (MD-4), variants under the Secure Hash Algorithm (SHA), variants under the Research-and-Development-in-Advanced-Communications-Technologies-in Research-and-Development-in-Advanced-Communications-Technologies-in Europe Integrity Primitives Evaluation Message Digest (RIPEMD) algorithm, variants under the Tiger algorithm, variants under the Whirlpool algorithm, etc. The checksum or hash functions may be performed by WID 201. The length, checksum or hash function calculation may also be performed by a network infrastructure device, for example switch 102 or data collector 200, with the results forwarded to WID 201.

For example, the length of TCP payload of a packet within block 400 may be compared with the adjusted payload length of a packet within block 401. The length of TCP payload may be obtained by subtracting the TCP protocol overhead length from the length of a logged packet within block 400. The adjusted payload length may be obtained by subtracting the overhead length of the specific wireless protocol from the length of a logged wireless packet within block 401. Please note that payload length may be invariant with regard to encryption.

For example, the checksum of TCP payload of a packet within block 400 may be compared with the checksum of payload of a packet within block 401.

For example, the hash function value of TCP payload of a packet within block 400 may be compared with the hash function value of payload of a packet within block 401.

The comparison may be embodied as a subtraction operation between the respective lengths, checksums or hash function values of two payloads being compared.

Figure 5:
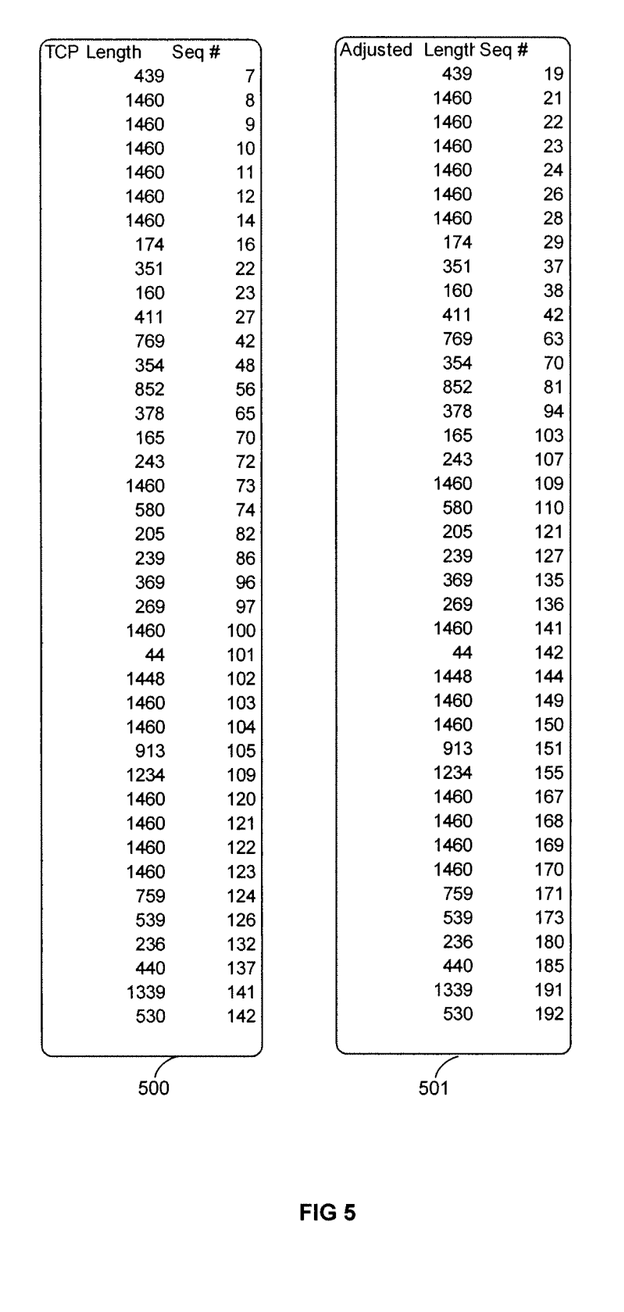
FIG. 5 shows an exemplary result of matching transmission control protocol (TCP) payload lengths of packets logged from a switch port connected to an area covered by an access point (AP) with the adjusted packet lengths of packets logged from the area covered by the access point (AP).

FIG. 5 shows an exemplary result of matching TCP payload lengths of packets logged from a switch port connected to an area covered by an access point (AP) with adjusted packet lengths of packets logged from the area covered by the access point (AP). The experiment was conducted by having client 101 engaged in a HTTPS session with a web-server via AP 100 and switch 102. The logged wireless packets came from data collector 200 while the logged wired packets came from a port on switch 102 connected to AP 100. Block 500 shows the sub-sequence of TCP packet with matching lengths logged within block 400 while block 501 shows the corresponding sub-sequence of TCP packets with matching lengths logged with block 401. The experiment confirmed that matching TCP payload length to adjusted payload length may be a feasible solution even though the sequence numbers of these matches vary significantly because of the nature of packet switching in the networks.

Figure 6:
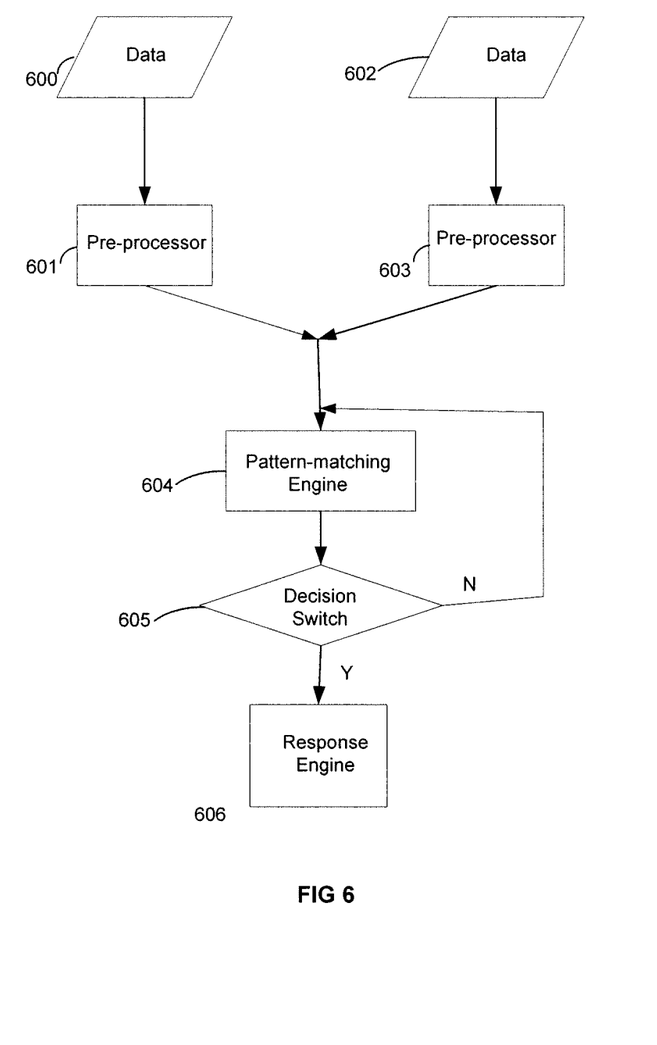
FIG. 6 depicts an exemplary embodiment of the current invention as a flow chart.

FIG. 6 depicts an exemplary embodiment of the current invention as a flow chart. The flow may initiate by collecting data 600 as a first log, and data 602 as a second log. Data 600 may be a log of network traffic monitored from a switch port connected to an area covered by an access point (AP) while data 602 may be a log of wireless traffic observed in the area covered by the AP. Data 600 and 602 may be pre-processed by pre-processors 601 and 603 respectively to remove non-data-carrying packets such as those for management and control frames, retransmission packets, etc. Pre-processors 601 and 603 may also remove protocol overhead from packets to obtain payload of packets. Pre-processors 601 and 603 may further obtain payload length, payload checksum, and/or hash of payload. Then a pattern-matching engine 604 may analyze pre-processed data 600 and 602 for matching patterns in which sub-sequences of packets in pre-processed data 600 are being matched to sub-sequences in pre-processed data 602. The pattern-matching results may be sent to a decision switch 605, which may be, for example, a threshold comparator, to make a binary decision whether or not there is an unauthorized AP. If the decision is Yes, then response engine 606 may be invoked to generate a response based on a set of rules. If the decision is No, then the flow may resume to continued comparison of more pre-processed data 600 and 602.

For example, WID 201 may initiate, periodically, a traffic pattern matching operation in which data collector 200 installed in areas where suspected unauthorized AP may be present may begin capturing wireless packets on link 103 to generate data 602, containing a log of wireless traffic observed. WID 201 may receive data 602 via link 203 in unprocessed form. Data 602 may also be first processed by pre-processor 603 and then sent to WID 201 via link 203. WID 201 may have a receiving device, e.g., a wireless receiver, for receiving data 602. In the mean time, data 600, corresponding to a log of network traffic from a port on switch 102 connected to an area being monitored may be generated. Data 600 may be obtained via a port mirroring operation wherein a copy of all network traffic to and/or from a port on switch 102 may be forwarded to WID 201. WID 201 may have a receiving device, e.g., a network interface card (NIC), for receiving data 602

Pre-processors 601 and 603 may be computer application programs running on WID 201, switch 102, or data collector 200. Pre-processors 601 and 603 may be, for example, executed computer scripts that may be written in the Practical Extraction and Report Language (PERL) or executed computer application programs written in an appropriate programming language to remove non-data-carrying packets and/or to remove protocol overhead to obtain payload information related to packets from data 600 and 602 respectively.

Pattern-matching engine 604 may be a computer application program running on WID 201. Pattern-matching engine 604 may be, for example, a computer script written in the common List Processing (LISP) language that is especially suited for pattern matching and recursion schemes or an executed computer application program written in an appropriate programming language.

The task of sequence matching in the current invention is to find the sub-sequence common to both sequences logged in data 600 and 602. According to classic computer science theory, this type of task is nondeterministic polynomial-time hard (NP-hard) for the general case of an arbitrary length of input sequences. This means that the stated task of finding the subsequence common to both sequences in data 600 and 602 may be solvable in polynomial time by exemplary techniques such as, for example, dynamic programming, a method of solving problems exhibiting the properties of overlapping sub-problems and optimal sub-structure as exhibited in the task. These exemplary techniques may take much less time than naive methods of searching, for all constituent and all possible lengths, both data 600 and 602 for a match. Other exemplary techniques may include, for example, genetic algorithms, artificial neural networks, wavelet transforms, etc.

Sequence matching results may be quantified as, for example, percentage of matches, within, for example, 10,000 packets logged or 30 seconds of searching. The quantified result may be used by decision switch 605. Decision switch 605 may be, for example, a threshold comparator. The threshold may be configurable depending on the specific pattern matching being performed. The threshold may be a multi-dimensional parameter and may be adjusted per statistical analysis of large pools of data. The threshold may be the result of a process manifested as a type of machine learning or artificial intelligence scheme. For example, a machine learning process may be used to arrive at a threshold that is particularly adapted to differentiate match/no-match.

Response engine 606 may be a computer program running on WID 201. Response engine 606 may be, for example, a computer script written in the common List Processing (LISP) language that is especially suited for rule-based invocation of responses or an executed computer application program written in another appropriate programming language.

The responses may include: for example, communicating with switch 102 through a network management interface to disable (e.g., shutting off) the port connected to an identified unauthorized AP or to filter traffic to and from a detected unauthorized wireless AP on the port connected thereto. The response may also include sending an alert to the person responsible for network security of the location. Upon receiving an alert, the person responsible for network security may, for example, verify the incident, record the location of the detected authorized AP, and shut down the switch port connected thereto.

Pre-processors 601 and 603, pattern-matching engine 604, and response engine 606 may also be embodied as dedicated hardware such as computers, devices with embedded software, for example, FPGA devices and programmable logic devices, or even application specific integrated circuits (ASICs).

The current invention may monitor network traffic passively, without injecting discovery or market packets into the network. Thus, there is no disruption to normal network operations and no advance warning that an unauthorized user may detect in order to take evasive counter-measures, for example, by shutting off AP 100 temporarily.

Traffic finger-prints of an unauthorized use may be identified, even in the presence of NAT and firewall that may mask, for example, MAC addresses of packets. Furthermore, traffic finger-print may also work with encrypted data.

According to the current invention, wireless traffic from an unauthorized AP may be shut off by turning off the switch port connected thereto. Thus, unauthorized traffic may be prevented from entering the LAN. The physical address of an identified unauthorized device may also be obtained, given knowledge of network topology.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method to detect network intrusion comprising:
   collecting a first log of packets in wireless network traffic in the vicinity of an area suspected to have one or more unauthorized access points (APs) and a second log of packets in network traffic from a switch port connected to the area, the first and second logs comprise at least one captured packet representing network traffic;
   pre-processing the first and second logs, including removing protocol overhead from the at least one captured packet in the first log and the at least one captured packet in the second log to obtain payload contents of the captured packets in the first and second logs;
   analyzing the payload contents of the captured packets in the pre-processed first log and the pre-processed second log to identify matching patterns, wherein sub-sequences of the at least one captured packet in the pre-processed first log are matched to sub-sequences of the captured at least one packet in the pre-processed second log; and
   generating a response based on a set of rules in response to an identification of matching patterns in the sub-sequences.

2. The method as set forth in claim 1, wherein pre-processing the first and second logs includes removing at least one non-data-carrying packet.

3. The method as set forth in claim 1, wherein the analyzing further comprises comparing the payload contents of the captured packets in the pre-processed first and second logs.

4. The method as set forth in claim 1, wherein the analyzing further comprises comparing the payload contents of the captured packets in the pre-processed first and second logs by comparing at least one of the following properties of the payload contents: a checksum, a hash, a length, and variations thereof.

5. The method as set forth in claim 1, wherein the identification of matching patterns is performed by at least one of: dynamic programming, genetic algorithms, artificial neural network, wavelet transform, and variations thereof.

6. The method as set forth in claim 1, further comprising:
   quantifying pattern matching results and comparing the quantification against a threshold to determine whether there is an unauthorized access point (AP).

7. The method as set forth in claim 1, wherein generating the response comprises:
   shutting off the switch port connected to the area suspected to have one or more unauthorized access points (APs).

8. A non-transitory computer-readable medium storing computer-readable instructions, which when executed by a computer system, cause the computer system to perform operations to detect network intrusion, the computer-readable instructions comprising code to:
   pre-process a first log of packets in wireless network traffic in the vicinity of an area suspected to have one or more unauthorized access points and a second log of packets in network traffic from a switch port connected to the area, wherein each of the first and second logs comprises at least one captured packet representing network traffic, wherein to pre-process the first log and the second log, the code is to remove protocol overhead from the packets in the first and second logs, to obtain payload contents of the captured packets in the first and second logs; and
   analyze the payload contents of the captured packets in the pre-processed first log and the pre-processed second log to identify matching patterns, wherein sub-sequences of the at least one captured packet in the pre-processed first log are matched to sub-sequences of the at least one captured packet in the pre-processed second log.

9. The non-transitory computer-readable medium as set forth in claim 8, wherein the computer-readable instructions further comprise code to:
   obtain the first log of packets in wireless network traffic in the vicinity of the area suspected to have one or more unauthorized access points;
   obtain the second log of packets in network traffic from a switch port connected to the area; or
   pre-process the first and second logs to remove at least one non-data-carrying packet.

10. The non-transitory computer-readable medium as set forth in claim 8, wherein the code to analyze the payload contents of the captured packets in the pre-processed first log and the pre-processed second log further comprises code to:
    compare at least one of the following properties of the payload contents of the sub-sequences of captured packets in the pre-processed first and second logs: a checksum, a hash, a length, and variations thereof.

11. The non-transitory computer-readable medium as set forth in claim 8, wherein the computer-readable instructions further comprise code to:
    quantify pattern matching results and perform a binary decision whether there is an unauthorized access point (AP).

12. An apparatus to detect network intrusion, comprising:
    a memory on which is stored machine readable instructions to:
    receive a first log of packets in wireless network traffic from a data collector that is to collect the first log of wireless network traffic in the vicinity of an area suspected to have one or more unauthorized access points;
    receive a second log of packets in network traffic from a switch port connected to the area suspected to have one or more unauthorized access points;
    pre-process the first and second logs, wherein each of the first and second logs comprises at least one captured packet representing network traffic, wherein to pre-process the first and second logs, the machine readable instructions are to remove protocol overhead from the packets in the first and second logs, to obtain payload contents of the captured packets in the first and second logs; and
    analyze the payload contents of the captured packets in the pre-processed first log and pre-processed second log to identify matching patterns, wherein sub-sequences of the at least one captured packet in the pre-processed first log are matched to sub-sequences of the at least one captured packet in the pre-processed second log; and a processor to implement the machine readable instructions.

13. The apparatus as set forth in claim 12, wherein the data collector is a wireless access point (AP).

14. The apparatus as set forth in claim 12, wherein the processor is further to have access to configuration and management interfaces of the switch.

15. The apparatus as set forth in claim 12, wherein the machine readable instructions are further to, at least one of:
   pre-process the first and second logs to remove at least one non-data-carrying packet;
   determine whether there is an unauthorized access point based on the pattern matching result; and
   generate a response based on a set of rules if an unauthorized access point is detected.

16. The apparatus as set forth in claim 12, wherein the machine readable instructions are further to quantify pattern matching results and perform a binary decision as to whether there is an unauthorized access point.

\* \* \* \* \*